(12) United States Patent
Chen (10) Patent No.: US 12,362,553 B1
(45) Date of Patent: Jul. 15, 2025

(54) OVERSHOOT PROTECTION CIRCUIT, METHOD, AND CHIP

(71) Applicant: AUTOCHIPS WUHAN CO., LTD., Wuhan (CN)

(72) Inventor: Junfeng Chen, Wuhan (CN)

(73) Assignee: AUTOCHIPS WUHAN CO., LTD., Wuhan (CN)

( * ) Notice: Subject to any disclaimer, the term of this patent is extended or adjusted under 35 U.S.C. 154(b) by 0 days.

(21) Appl. No.: 19/171,293

(22) Filed: Apr. 6, 2025

Related U.S. Application Data

(63) Continuation of application No. PCT/CN2023/089896, filed on Apr. 21, 2023.

(30) Foreign Application Priority Data

Oct. 8, 2022 (CN) .......................... 202211221455.7

(51) Int. Cl.
*H02H 3/20* (2006.01)
*H02H 3/02* (2006.01)

(52) U.S. Cl.
CPC ................ *H02H 3/20* (2013.01); *H02H 3/02* (2013.01)

(58) Field of Classification Search
CPC ..... G05F 1/00; G05F 1/40; G05F 1/16; G05F 1/46; G05F 3/26; G05F 1/567;
(Continued)

(56) References Cited

U.S. PATENT DOCUMENTS 6,175,223 B1 * 1/2001 Martinez ................... G05F 1/46
323/901
10,656,664 B1 5/2020 Sato
(Continued)

FOREIGN PATENT DOCUMENTS

CN 101568893 A 10/2009
CN 101763139 A 6/2010
(Continued)

OTHER PUBLICATIONS

World of Electronic Products, 12; Dec. 4, 2016 ; Ma Yongwang; He Yang; Du Pengcheng; Li Zhenguo; Hu Yi; Tang Xiaoke;, High precision and low-power voltage stabilization circuit for financial dual interface chips; Text 1-11; Publication dated Dec. 4, 2016 ( 11 pages ).
(Continued)

*Primary Examiner* — Danny Nguyen (57) ABSTRACT

An overshoot protection circuit, a method, and a chip. The overshoot protection circuit includes: a low drop regulator (LDO), a reference source circuit, a switching controller, and a rough reference voltage generation circuit. The switching controller is configured to control the LDO to be connected to the rough reference voltage generation circuit in a first stage of power supply signal change, connected to the reference source circuit in a second stage of power supply signal change. The rough reference voltage generation circuit is configured to generate a first preset reference voltage, and the reference source circuit is configured to generate a second preset reference voltage; in the first stage,
(Continued)

the switching controller is configured to electrically connect the LDO to the first preset reference voltage; in the second stage, the switching controller is configured to electrically connect the LDO to the second preset reference voltage.

18 Claims, 3 Drawing Sheets

(58) Field of Classification Search
CPC    H02H 3/20; H02H 3/02; H02H 3/087; H02H 3/202; H02H 9/001; H02H 9/004; H02H 9/005; H02H 9/046; H02H 9/008
USPC .......................................... 361/91.1
See application file for complete search history.

(56) References Cited

U.S. PATENT DOCUMENTS

| | | | |
|---|---|---|---|
| 10,877,501 | B1 | 12/2020 | Zhang et al. |
| 2007/0063736 | A1 | 3/2007 | Biagi |
| 2008/0136382 | A1* | 6/2008 | Chellamuthu .......... H02M 1/36 |
| | | | 323/234 |
| 2009/0237055 | A1 | 9/2009 | Sakai et al. |
| 2010/0264896 | A1 | 10/2010 | Tonomura |
| 2013/0200873 | A1 | 8/2013 | Wu |
| 2016/0116927 | A1 | 4/2016 | Chen |
| 2020/0326739 | A1 | 10/2020 | Zhao et al. |
| 2020/0401167 | A1 | 12/2020 | Helmy Zaky et al. |

FOREIGN PATENT DOCUMENTS

| | | |
|---|---|---|
| CN | 104777869 A | 7/2015 |
| CN | 105446404 A | 3/2016 |
| CN | 105652949 A | 6/2016 |
| CN | 109521825 A | 3/2019 |
| CN | 109976438 A | 7/2019 |
| CN | 115454191 A | 12/2022 |
| CN | 115480611 A | 12/2022 |
| JP | 2000099173 A | 4/2000 |
| JP | 2005157523 A | 6/2005 |
| JP | 2014006794 A | 1/2014 |
| JP | 2018112963 A | 7/2018 |

OTHER PUBLICATIONS

Chinese First Office Action, Chinese Application No. 202211221455.7, mailed Apr. 20, 2023 (18 pages).
Chinese Notification to Grant Patent Right for Invention, Chinese Application No. 202211221455.7, mailed Sep. 6, 2023 (5 pages).
International Search Report and Written Opinion, International Application No. PCT/CN2023/089896, mailed Aug. 25, 2023 (18 pages).

* cited by examiner

OVERSHOOT PROTECTION CIRCUIT, METHOD, AND CHIP

CROSS-REFERENCE TO RELATED APPLICATIONS

The present application is a continuation-application of International (PCT) Patent Application No. PCT/CN2023/089896, filed on Apr. 21, 2023, which claims priority of Chinese Patent Application No. 202211221455.7, filed on Oct. 8, 2022, the entire contents of which are hereby incorporated by reference in their entirety.

TECHNICAL FIELD

The present disclosure relates to the field of chip technologies, and in particular to an overshoot protection circuit, a method, and a chip.

BACKGROUND

With the continuous expansion of application scenarios and demands, chip power supply solutions have evolved beyond traditional battery-based systems, with Low Drop Regulators (LDOs) and DC-DC converters becoming prevalent choices for their rapid startup capabilities—capable of achieving voltage ramp-up speeds up to 100V/ms. In addition, the overall power consumption requirements of the chip are gradually decreasing. Under the requirements of low power consumption and rapid power-on, higher requirements are placed on the power management module of the chip.

In the related art, the power management module of the chip generally generates different power domains by using a bandgap voltage reference (referred to as a "bandgap") to provide reference voltages to several LDOs. In this fast power-on mode, the output voltage of the low-power bandgap (LPBG) is prone to overshoot, which in turn causes the output voltage of the LDO to overshoot as well, possibly causing damage to the LDO's downstream circuit. In the related art, overshoot is avoided by waiting for the power supply signal to be suitable before turning on the bandgap voltage reference or by optimizing the startup circuit to increase the complexity of startup. However, the above methods will affect the startup rate of the LDOs to a certain extent. Therefore, how to efficiently ensure the stable operation of the LDOs is an urgent problem that is required to be solved.

SUMMARY OF THE DISCLOSURE

In view of this, it is necessary to provide an overshoot protection circuit and chip to overcome the instability and inefficiency of the LDO in the related art due to the influence of the power signal.

To solve the above technical problem, the present disclosure provides an overshoot protection circuit, including: a low drop regulator (LDO), a reference source circuit, a switching controller, and a rough reference voltage generation circuit; wherein the switching controller is configured to control the LDO to be connected to the rough reference voltage generation circuit in a first stage of power supply signal change, and control the LDO to be connected to the reference source circuit in a second stage of power supply signal change.

In some embodiments, the overshoot protection circuit further includes a comparison circuit, respectively electrically connected to the reference source circuit and the switching controller, and the switching controller is respectively electrically connected to the reference source circuit, the rough reference voltage generation circuit, and the LDO.

In some embodiments, the switching controller includes at least one switch; opening and closing of the at least one switch is controlled in response to a trigger signal of the comparison circuit, and the reference source circuit or the rough reference voltage generation circuit is caused to be electrically connected to the LDO via the at least one switch that is opened or closed.

In some embodiments, the at least one switch includes a first switch and a second switch, the first switch being electrically connected to the reference source circuit and the second switch being electrically connected to the rough reference voltage generation circuit.

In some embodiments, the comparison circuit includes a comparator and a delay circuit, the comparator being respectively electrically connected to the delay circuit and the reference source circuit, and the delay circuit being electrically connected to the switching controller; wherein a positive input terminal of the comparator is electrically connected to a voltage-dividing resistor terminal of a power supply, a negative input terminal of the comparator is electrically connected to the reference source circuit, an output terminal of the comparator is electrically connected to an end of the delay circuit, and another end of the delay circuit is electrically connected to the switching controller to input a trigger signal to the switching controller.

In some embodiments, the rough reference voltage generation circuit is configured to generate a first preset reference voltage, and the reference source circuit is configured to generate a second preset reference voltage; in the first stage of power supply signal change, the switching controller is configured to electrically connect the LDO to the first preset reference voltage; in the second stage of power supply signal change, the switching controller is configured to electrically connect the LDO to the second preset reference voltage.

In some embodiments, the first stage is a preset rapid change stage of a power supply signal, and in response to a first trigger signal of the comparison circuit, the first preset reference voltage is taken as a reference source for the LDO via the switching controller; the second stage is a preset stable stage of the power supply signal, and in response to a second trigger signal of the comparison circuit, the second preset reference voltage is taken as the reference source for the LDO via the switching controller.

In some embodiments, the reference source circuit includes a bandgap voltage reference source and a buffer register, the bandgap voltage reference source being electrically connected to a voltage-dividing resistor terminal of a power supply and the comparison circuit, and the buffer register being electrically connected to the bandgap voltage reference source and the switching controller.

In some embodiments, the second preset reference voltage is generated by resistive voltage division or a MOS tube or a constant current source in the rough reference voltage generation circuit.

The present disclosure further provides an overshoot protection method, performed by the overshoot protection circuit as above and including:
  performing a circuit powering-on;
  in a case where the comparison circuit outputs a first trigger signal, triggering the switching controller to control the LDO to be connected to the rough reference voltage generation circuit; wherein a first preset reference voltage generated by the rough reference voltage generation circuit is taken as a reference source for the LDO; the first trigger signal indicates that a change stage of a power supply signal is the first stage which is a rapid change stage; and in a case where the comparison circuit outputs a second trigger signal, triggering the switching controller to control the LDO to connect to the reference source circuit; wherein a second preset reference voltage generated by the reference source circuit is taken as the reference source for the LDO; the second trigger signal indicates that the change stage of the power supply signal is the second stage which is a stable change stage.

The present disclosure further provides a chip, including the overshoot protection circuit as above.

The beneficial effects of the present disclosure over the related art include the following. By setting up a comparator, a corresponding trigger signal is generated and input to the switching controller, such that the switching controller can be triggered to switch using the comparator. By setting up the switching controller to be electrically connected to the reference source circuit, the rough reference voltage generation circuit, and the LDO, the switching controller can switch the electrical connection between the reference source circuit, the rough reference voltage generation circuit, and the LDO, thereby ensuring that during the different stages of change in the power signal, the reference source circuit or the rough reference voltage generation circuit is electrically connected to the LDO, such that the LDO can follow the changes in the power signal. More importantly, by adding the rough reference voltage generation circuit, the rough reference voltage generation circuit can provide a reference voltage for subsequent circuits instead of the reference source circuit during rapid startup, thereby avoiding overshoot in the reference source circuit, ensuring stable operation, and ensuring flexibility in adapting to changes in the power signal.

DETAILED DESCRIPTION

The following description illustrates specific embodiments of the present disclosure, together with the accompanying drawings, which form a part of the present disclosure and are intended to explain the principles of the present disclosure, but not to limit the scope of the present disclosure.

In the description of the present disclosure, the terms "first" and "second" are intended for descriptive purposes only and are not to be understood as indicating or implying relative importance or as implying a specification of the number of technical features indicated. Thus, features limited with "first" or "second" may expressly or impliedly include at least one of such features. In addition, the meaning of "multiple" is at least two, for example, two, three, etc., unless otherwise expressly and specifically limited.

In the description of the present disclosure, a reference to "embodiments" means that a particular feature, structure, or characteristic described in conjunction with an embodiment may be included in at least one embodiment of the present disclosure. The phrase does not necessarily refer to the same embodiment each time it appears in the description, nor is it a separate or alternative embodiment that is mutually exclusive from other embodiments. It is expressly and implicitly understood by those skilled in the art that the embodiments described may be combined with other embodiments.

The present disclosure provides an overshoot protection circuit and chip, which utilizes a switching controller to switch the electrical connection relationship between a reference source circuit, a rough reference voltage generation circuit, and an LDO, and utilizes a comparator to monitor changes in the reference source circuit to trigger switching of the switching controller, thereby providing a new idea for further improving the stable and efficient operation of the LDO. Before describing the embodiments, relevant terms are explained.

Low Drop Regulator (hereinafter referred to as LDO): which utilizes a transistor or FET operating in its linear region to subtract an excess voltage from the applied input voltage to produce a regulated output voltage; is in small packages, has excellent performance, and provides value-added features such as thermal overload protection and safe current limiting; can greatly reduce power consumption in the shutdown mode.

Bandgap voltage reference (shorted as Bandgap): which is configured to generate a power supply and process-independent direct current voltage or current with defined temperature characteristics. The most classic bandgap voltage reference is the sum of a voltage with a positive temperature coefficient and a voltage with a negative temperature coefficient, where the temperature coefficients cancel each other out to achieve a temperature-independent voltage reference of approximately 1.25V. Because the reference voltage is similar to the bandgap voltage of silicon, it is called a bandgap voltage reference. In practice, the bandgap voltage is not actually used. The output voltage of some bandgap voltage reference structures is also inconsistent with the bandgap voltage.

Based on the above description of technical terms, the bandgap voltage reference provides a reference voltage for the LDO, and the LDO supplies power to the chip from different power domains. In order to avoid the rapid startup of the power supply, which would cause overshoot of the signal from the bandgap voltage reference and thus affects the performance of the LDO, the following three solutions are commonly adopted in the related art.

The first is to control the power-on sequence, for example, using a comparator or delay module to wait until the power supply reaches a suitable value before turning on the Bandgap, thereby avoiding overshoot of the Bandgap.

The second is to use a simple comparison circuit to determine when the bandgap voltage reference voltage has dropped to a safe value before turning on the LDO, thereby protecting the LDO downstream circuit.

The third is to optimize the startup circuit by means of soft start or pre-charge to avoid overshoot.

Whether it is Solution 1 or plan 2, the essence is to filter out the overshoot caused by the rapid start of the power supply by waiting, which can to some extent avoid the impact caused by the overshoot. However, once the bandgap is normal or the power supply is normal, the waiting time will affect the startup speed of the LDO, which in turn slows down the startup speed of the entire chip. The Solution 3 can avoid overshoot to a certain extent by optimizing the startup circuit, but the startup speed will also be affected as a result, and the control signal and feedback loop will be increased, which will increase the complexity of startup and reduce the stability of the system. Therefore, the present disclosure provides an overshoot protection circuit, a method, and a chip, focusing on solving how to ensure that the LDO can not only start up quickly in a case of rapid changes in the power supply signal, but also ensure that the accuracy of the LDO under normal operation is not affected, and avoid damage to the LDO's downstream circuit.

The following details the specific embodiments.

Figure 1:
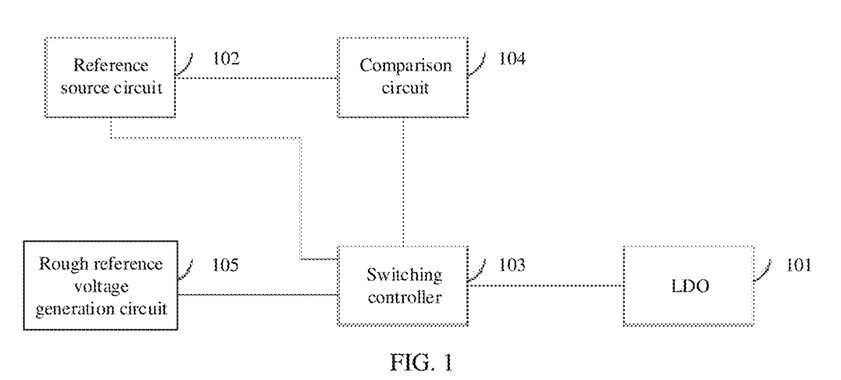
FIG. 1 is a structural schematic view of an overshoot protection circuit according to some embodiments of the present disclosure.

The present disclosure provides an overshoot protection circuit, the overshoot protection circuit including: a low drop regulator (LDO) 101, a reference source circuit 102, a switching controller 103, and a rough reference voltage generation circuit 105; where the switching controller 103 is configured to control the LDO 101 to be connected to the rough reference voltage generation circuit 105 in a first stage of power supply signal change, and control the LDO 101 to be connected to the reference source circuit 102 in a second stage of power supply signal change.

In the embodiments of the present disclosure, a corresponding trigger signal is passed to the switching controller to achieve the purpose of triggering the switching controller to switch using a comparator. The switching controller can switch the electrical connection relationship between the reference source circuit, the rough reference voltage generation circuit, and the LDO under the trigger of the comparator, ensuring that the reference source circuit or the rough reference voltage generation circuit is electrically connected to the LDO during different stages of the power supply signal change, such that the linear regulated voltage source can follow the power supply signal change, in particular, it can monitor and ensure stable operation at the appropriate reference voltage during rapid startup, thereby ensuring flexibility in adapting to changes in the power supply signal. More importantly, the rough reference voltage generation circuit can replace the reference source circuit to provide a reference voltage for subsequent circuits during rapid startup, thereby avoiding overshoot in the reference source circuit, ensuring stable operation, and ensuring flexibility in adapting to changes in the power supply signal.

In some embodiments, referring to FIG. 1, which is a structural schematic view of an overshoot protection circuit according to some embodiments of the present disclosure, the overshoot protection circuit further includes a comparison circuit 104, which is respectively electrically connected to the reference source circuit 102 and the switching controller 103, and the switching controller 103 is respectively electrically connected to the reference source circuit 102, the rough reference voltage generation circuit 105, and the LDO 101.

In the embodiments of the present disclosure, by setting up an electrical connection structure between the comparator and the reference source circuit and the switching controller, the comparator receives a signal from the reference source circuit, generates a corresponding trigger signal, and inputs the trigger signal to the switching controller, so as to achieve the purpose of using the comparator to trigger the switching controller to switch. By setting up an electrical connection structure between the switching controller and the reference source circuit, the rough reference voltage generation circuit, and the LDO, the switching controller can switch the electrical connection relationship between the reference source circuit, the rough reference voltage generation circuit, and the LDO, to ensure that the reference source circuit or the rough reference voltage generation circuit is electrically connected to the LDO during different stages of power supply signal change, such that the LDO can follow the changes in the power supply signal, and can operate stably while starting up quickly, thereby ensuring flexibility in different application scenarios.

In some embodiments, the comparison circuit 104 may be replaced with other trigger circuits, which are also electrically connected to the switching controller 103, and other trigger methods may be applied to control the switching controller 103 to switch between the reference source circuit 102 and the rough reference voltage generation circuit 105.

In the embodiments of the present disclosure, regarding the switching stages, there may be other triggering methods to be adopted, such as a timer, and the switching controller may switch between the reference source circuit and the rough reference voltage generation circuit using other trigger circuits.

Figure 2:
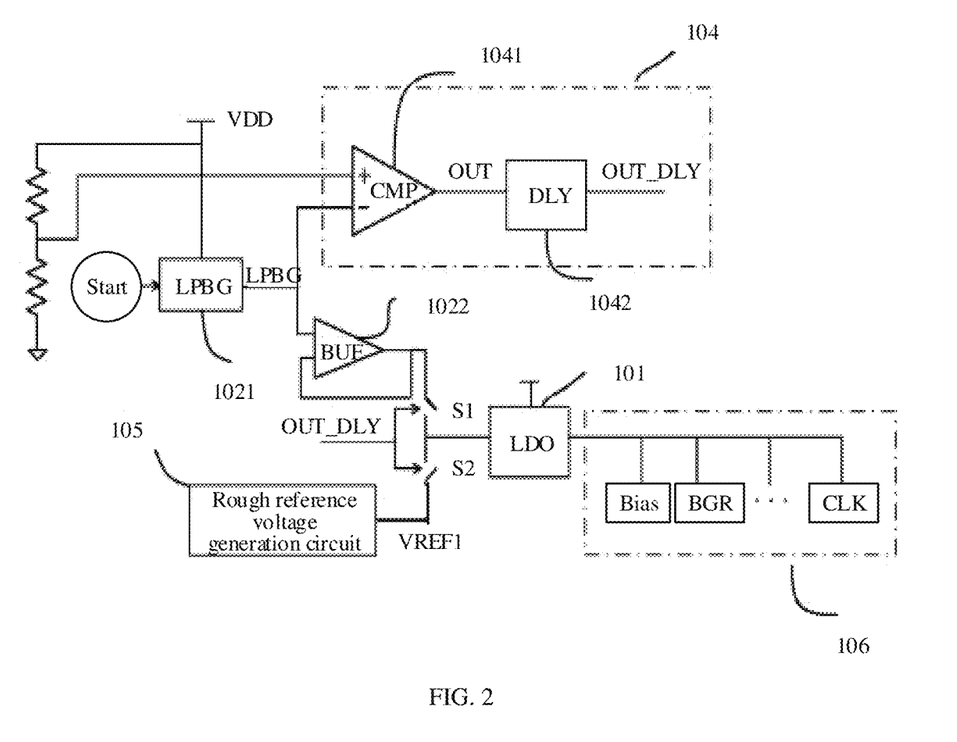
FIG. 2 is a structural schematic view of an overshoot protection circuit according to other embodiments of the present disclosure.

In some embodiments, in combination with FIG. 2, FIG. 2 is a structural schematic view of an overshoot protection circuit according to other embodiments of the present disclosure. The switching controller 103 includes at least one switch. Under the trigger signal of the comparison circuit 104, the opening and closing of the at least one switch is controlled, such that the reference source circuit 102 or the rough reference voltage generation circuit 105 is electrically connected to the LDO 101 via the at least one switch that is opened or closed.

In the embodiments of the present disclosure, switching is performed via at least one switch in the switching controller to electrically connect the LDO to the reference source circuit or the rough reference voltage generation circuit.

In some embodiments, the time of overshoot is measured in advance to obtain the measured overshoot time T. During the period from time 0 to T, under the trigger signal of the comparison circuit 104, the switching controller 103 is electrically connected to the rough reference voltage generation circuit 105, and during the period greater than time T, under the trigger signal of the comparison circuit 104, the switching controller 103 is connected to the reference source circuit 102.

In some embodiments, still referring to FIG. 2, the at least one switch includes a first switch S1 and a second switch S2, the first switch S1 being electrically connected to the reference source circuit 102 and the second switch S2 being electrically connected to the rough reference voltage generation circuit 105.

In the embodiments of the present disclosure, the first switch and the second switch are set to be respectively electrically connected to the reference source circuit and the rough reference voltage generation circuit, thereby achieving the purpose of rapid switching.

In some embodiments, still referring to FIG. 2, the comparison circuit 104 includes a comparator 1041 and a delay circuit 1042, the comparator 1041 being respectively electrically connected to the delay circuit 1042 and the reference source circuit 102, and the delay circuit 1042 being electrically connected to the switching controller 103.

In the embodiments of the present disclosure, the switching controller is effectively triggered to switch by the comparator and delay circuit in the comparison circuit.

In some embodiments, still referring to FIG. 2, a positive input terminal of the comparator 1041 is electrically connected to a voltage-dividing resistor terminal of a power supply, a negative input terminal of the comparator 1041 is electrically connected to the reference source circuit 102, an output terminal of the comparator 1041 is electrically connected to an end of the delay circuit 1042, and the other end of the delay circuit 1042 is electrically connected to the switching controller 103 to input the trigger signal to the switching controller 103.

In the embodiments of the present disclosure, by setting up the comparator, the different stages of the change in the power supply may be effectively determined according to the voltage-dividing resistor terminal of the power supply, so as to trigger the switching controller to switch.

In some embodiments, still referring to FIG. 2, the rough reference voltage generation circuit 105 is configured to generate a first preset reference voltage, the reference source circuit 102 is configured to generate a second preset reference voltage, and in the first stage of power supply signal change, the switching controller 103 is configured to electrically connect the LDO 101 to the first preset reference voltage, and in the second stage of power supply signal change, the switching controller 103 is configured to electrically connect the LDO 101 to the second preset reference voltage.

In the embodiments of the present disclosure, the reference source circuit and the rough reference voltage generation circuit generate different reference voltages. At different stages of the power supply signal VDD changing, the comparison circuit determines the change of the voltage-dividing resistor terminal of the power supply by comparing the power supply signal VDD with the voltage generated by the reference source circuit, thereby determining the different stages of the change of the power supply signal VDD, and the LDO is electrically connected to the first preset reference voltage or the second preset reference voltage by switching the switching controller.

In some embodiments, still referring to FIG. 2, the first stage is a preset rapid change stage of the power supply signal, and under a first trigger signal of the comparison circuit 104, the first preset reference voltage is taken as a reference source for the LDO 101 via the switching controller 103; the second stage is a preset stable stage of the power supply signal, and under a second trigger signal of the comparison circuit 104, the second preset reference voltage is taken as a reference source for the LDO 101 via the switching controller 103.

In the embodiments of the present disclosure, during the first stage of the preset rapid change of the power supply signal VDD, the rough reference voltage generation circuit generates a corresponding first preset reference voltage to replace the second preset reference voltage of the reference source circuit, such that during the rapid start-up, the first preset reference voltage generated by the rough reference voltage generation circuit provides the reference voltage for the subsequent circuit, thereby avoiding the overshoot of the reference source circuit and ensuring stable operation during the first stage of the preset rapid change. In addition, in the second stage of the preset stable change of the power supply signal VDD, the power supply signal VDD is operating stably and therefore does not overshoot. When this stage is entered, the switching controller may be connected to the reference source circuit, and the second preset reference voltage generated by the reference source circuit may be taken as the reference voltage for subsequent circuits to ensure stable power supply. Combining with the switching of the rough reference voltage generation circuit and the reference source circuit, the above technical solution is adapted to the change of the power supply signal VDD, thereby effectively avoiding overshoot and ensuring the overall stable operation.

Specifically, still referring to FIG. 2, the power supply signal VDD is taken as a positive input of the comparator 1041 (which is marked as CMP in FIG. 2) via a resistor voltage divider, and the second preset reference voltage generated by the reference source circuit 102 taken as a negative input of the comparator 1041. During the rapid rise of the power supply signal VDD, a bandgap voltage reference source 1021 in the reference source circuit 102 overshoots. As the power supply signal VDD rises, the positive terminal voltage of the comparator 1041 is lower than the negative terminal voltage, and the output OUT of the comparator 1041 is low level 0, which is judged to be the first stage of a rapid change in the power supply signal VDD. In this case, overshoot is likely to occur. When the power-on process is completed, the second preset reference voltage output by the bandgap voltage reference source 1021 in the reference source circuit 102 begins to decrease and return to its normal value. In this case, the positive terminal voltage of the comparator 1041 is greater than the negative terminal voltage, and the output OUT of the comparator 1041 is high level 1, which is judged to be the second stage of a stable change in the power supply signal VDD. Further, the output of the comparator 1041 is passed through the delay circuit 1042 (which is marked as DLY in FIG. 2) to generate the trigger signal OUT_DLY, which serves as a control signal input for a reference voltage source selection switch of the LDO 101.

When the trigger signal OUT_DLY is low level 0, the rough reference voltage generation circuit 105 is turned on, and the first preset reference voltage generated is taken as the reference voltage source for the LDO 101, and the first switch S1 is turned on. When the trigger signal OUT_DLY is high level 1, the rough reference voltage generation circuit 105 is turned off to reduce additional power consumption, and the second switch S2 is turned on. The second preset reference voltage generated by the reference source circuit 102 is taken as the reference voltage source for the LDO 101, such that the accuracy of the LDO 101 is improved.

In some embodiments, still referring to FIG. 2, the reference source circuit 102 includes a bandgap voltage reference source 1021 and a buffer register 1022, the bandgap voltage reference source 1021 being electrically connected to the voltage-dividing resistor terminal of the power supply and the comparison circuit 104, and the buffer register 1022 being electrically connected to the bandgap voltage reference source 1021 and the switching controller 103.

In the embodiments of the present disclosure, the buffer register and the bandgap voltage reference source are configured to effectively generate a second preset reference voltage as a reference source to provide a reference voltage for subsequent circuits during the second stage of a stable change in the power supply.

In some embodiments, the second preset reference voltage is generated by resistive voltage division or a MOS tube or a constant current source in the rough reference voltage generation circuit 105.

In the embodiments of the present disclosure, the first preset reference voltage is correspondingly generated by different circuit components to form a rough voltage signal that changes more smoothly with the power supply signal than the second preset reference voltage. In the first stage of a rapid change in the power supply signal, the rough reference voltage generation circuit is configured to generate a first preset reference voltage that changes smoothly with the power supply signal, which more smoothly provides a reference voltage to the subsequent circuit, thereby ensuring overall stable operation and avoiding overshoot problems.

Figure 3:
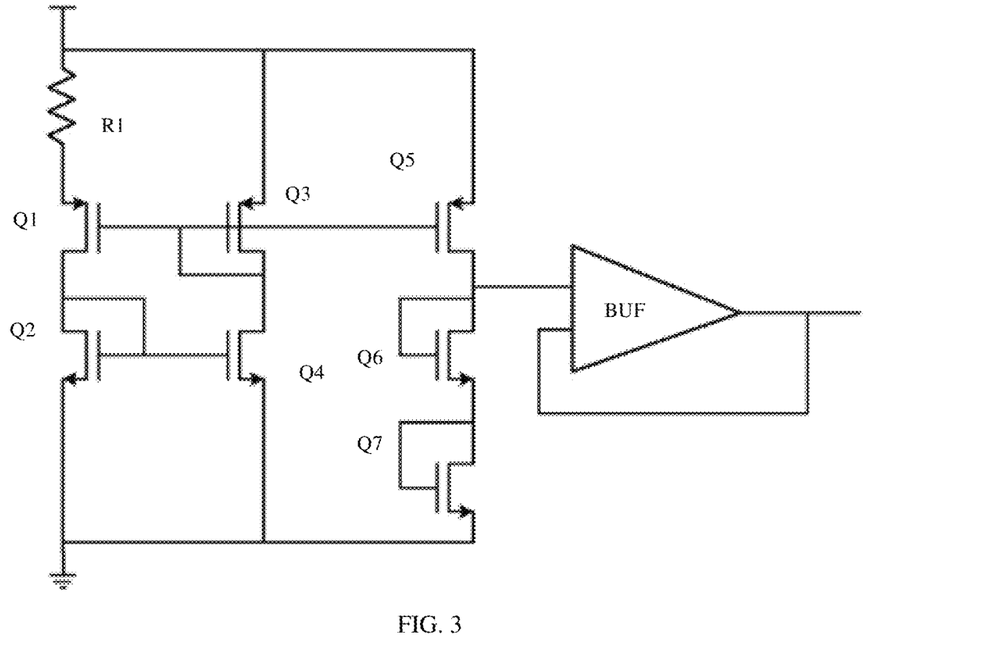
FIG. 3 is a structural schematic view of a rough reference voltage generation circuit according to some embodiments of the present disclosure.
Figure 4:
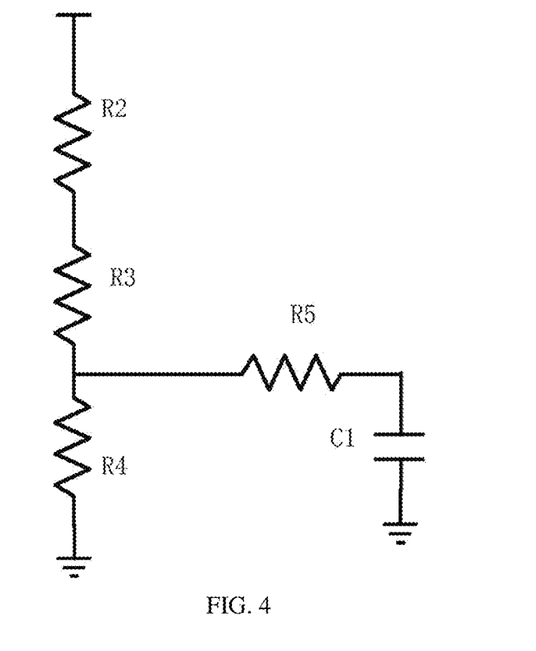
FIG. 4 is a structural schematic view of a rough reference voltage generation circuit according to other embodiments of the present disclosure.
Figure 5:
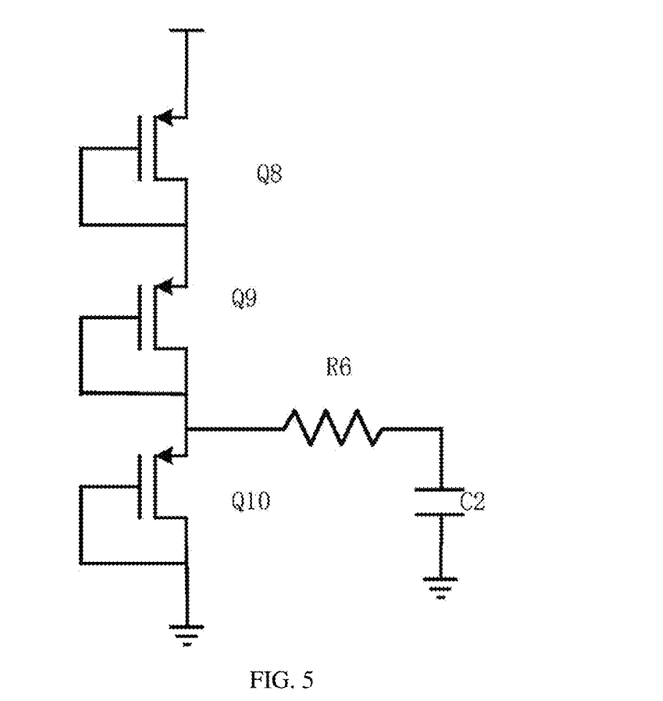
FIG. 5 is a structural schematic view of a rough reference voltage generation circuit according to further other embodiments of the present disclosure.

In some embodiments, referring to FIGS. 3 to 5, FIG. 3 is a structural schematic view of a rough reference voltage generation circuit according to some embodiments of the present disclosure, FIG. 4 is a structural schematic view of a rough reference voltage generation circuit according to other embodiments of the present disclosure, and FIG. 5 is a structural schematic view of a rough reference voltage generation circuit according to further other embodiments of the present disclosure.

As shown in FIG. 3, the rough reference voltage generation circuit 105 includes MOS tubes Q1 to Q7, a resistance R1, and a buffer register BUF, the principle of which is to generate current from a C-gm (constant current source) to power a diode (chip diode) to provide the rough first preset reference voltage.

As shown in FIG. 4, the rough reference voltage generation circuit 105 includes resistors R2 to R5 and a capacitor C1, the principle of which is to directly generate the rough first preset reference voltage by resistive voltage division.

As shown in FIG. 5, the rough reference voltage generation circuit 105 includes MOS tubes Q8 to Q10, a resistor R6, and a capacitor C2, the principle of which is that the MOS tubes implement a diode function to generate the rough first preset reference voltage.

It should be noted that during the rapid rise of the power supply signal VDD, the rough first preset reference voltage generated replaces the second preset reference voltage (LPBG) generated by the reference source circuit 102, which would otherwise overshoot, thereby protecting the downstream circuit of the LDO 101. The rough reference voltage generation circuit generates a rough reference voltage, that is, the first preset reference voltage, which is smoother during the overshoot stage in response to changes in the power supply signal than the second preset reference voltage generated by the reference source circuit.

Figure 6:
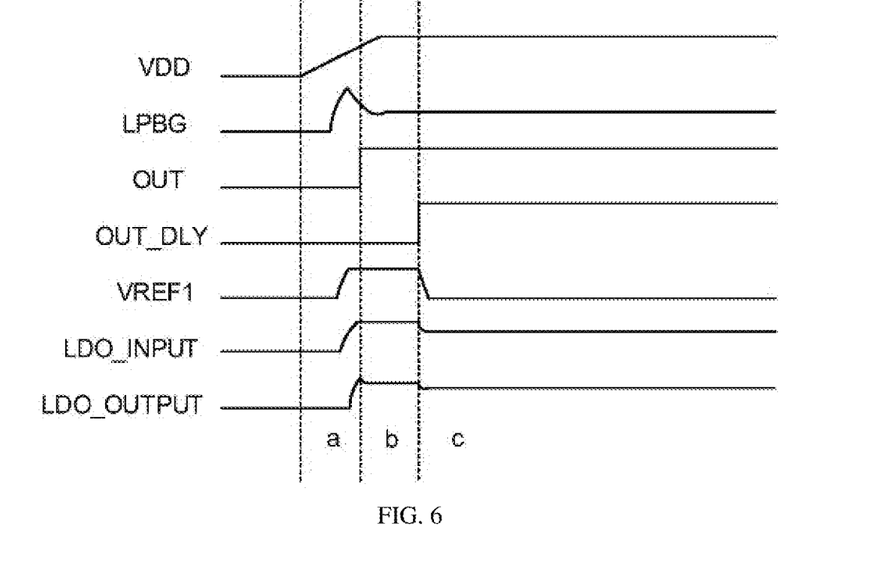
FIG. 6 is a waveform schematic diagram of each voltage signal change according to some embodiments of the present disclosure.

Referring to FIGS. 2 and 6, FIG. 6 is a waveform schematic diagram of each voltage signal change according to some embodiments of the present disclosure. When the power supply signal VDD is rapidly powered on, since the second preset reference voltage (LPBG) generated by the reference source circuit 102 has extremely low power consumption, the slow charging and discharging speed and low bandwidth of the branch circuit will result in a very slow start-up. Generally, a high current or strong voltage pull-up is adopted to start up the bandgap voltage reference 1021 in the reference source circuit 102 quickly and prevent it from entering an incorrect steady state. However, the output of the bandgap voltage reference source 1021 will overshoot the power supply signal VDD. If the second preset reference voltage (LPBG) output by the bandgap reference source 1021 is directly taken as the reference source of the LDO 101, the output voltage of the LDO 101 will also overshoot, which may cause damage to the low-voltage components in a downstream circuit 106 of the LDO 101. Therefore, The present disclosure, in order to save power, switches the reference voltage of the LDO 101 to a rough reference voltage (that is, the first preset reference voltage generated by the rough reference voltage generation circuit 105) during rapid power-on of the circuit, and switches the reference voltage of the LDO 101 back to an accurate reference voltage (that is, the second preset reference voltage generated by the reference source circuit 102) during normal operation of the circuit, that is, the output of the bandgap voltage reference source 1021. At the same time, the rough reference voltage generation circuit 105 is turned off to reduce power consumption.

The specific power-on waveform is shown below:

Stage a: the power supply signal VDD rises rapidly, and the output of LPBG (the second preset reference voltage) follows the rapid rise of the power supply signal VDD; the output OUT of comparator 1041 is low level 0, and the trigger signal OUT_DLY after delay by the delay circuit 1042 is low level 0; the rough reference voltage generation circuit 105 starts up quickly and generates the rough first preset reference voltage VREF1; since the output of trigger signal OUT_DLY is 0, the reference voltage selects the first preset reference voltage VREF1, and the LDO 101 starts up quickly.

Stage b: The start-up circuit of the reference source circuit 102 is turned off, and after a loop response adjustment, the output of the reference source circuit 102 drops and returns to its normal value. The output OUT of the comparator 1041 becomes high level 1, but the trigger signal OUT_DLY is still low level 0; the reference voltage of the LDO 101 is still the first preset reference voltage VREF1, and the LDO 101 maintains this output.

Stage c: After the trigger signal OUT_DLY is delayed by the delay circuit 1042, it switches from low level 0 to high level 1; the entire rough reference voltage generation circuit 105 is turned off, and the output of the first preset reference voltage VREF1 drops to 0. The LDO 101 selects the second preset reference voltage LPBG output by the reference source circuit 102 as the reference voltage, the input signal LDO_INPUT of the LDO 101 changes from the first preset reference voltage VREF1 to the second preset reference voltage LPBG, and the output signal LDO_OUTPUT of the LDO 101 changes accordingly, which is input to the load circuit 106.

The embodiments of the present disclosure further provide an overshoot protection method, based on the overshoot protection circuit as described above, including:
  powering up the circuit;
  when the comparison circuit outputs a first trigger signal, the change stage of the power supply signal is a first stage, triggering the switching controller to control the LDO to be connected to the rough reference voltage generation circuit; where a first preset reference voltage generated by the rough reference voltage generation circuit is taken as the reference source for the LDO; and
  when the comparison circuit outputs a second trigger signal, the change stage of the power supply signal is a second stage, triggering the switching controller to control the LDO to connect to the reference source circuit; where a second preset reference voltage generated by the reference source circuit is taken as the reference source for the LDO.

In the embodiments of the present disclosure, during the first stage of the power supply signal change, the comparator outputs a first trigger signal, and the LDO is connected to the rough reference voltage generation circuit through the switching controller, so as to avoid overshoot caused by the rapidly changing power supply signal. The first preset reference voltage generated by the rough reference voltage generation circuit is taken as the reference voltage for subsequent circuits. Compared with the second preset reference voltage generated by the reference source circuit, the first preset reference voltage is more stable with changes in the power supply signal, thereby effectively achieving a stable power supply. During the second stage of the power supply signal change, the comparator outputs a second trigger signal, and the LDO is connected to the reference source circuit through the switching controller. The second preset reference voltage generated by the reference source circuit is taken as the reference voltage for the subsequent circuit, in which case the power supply signal changes smoothly, and the overshoot may not be large. Using the reference source circuit may provide a more accurate reference voltage for the subsequent circuits. It should be noted that the first trigger signal output by the comparison circuit is a low level (output is 0), and the second trigger signal output by the comparison circuit is a high level (output is 1).

The embodiments of the present disclosure further provide a chip including an overshoot protection circuit as described above.

The present disclosure discloses an overshoot protection circuit and a chip. By setting up an electrical connection structure between the comparator and the reference source circuit and the switching controller, the comparator receives the signal from the reference source circuit, generates a corresponding trigger signal, and inputs it to the switching controller, for achieving the purpose of triggering the switching controller to switch by using the comparator. By setting up an electrical connection structure between the switching controller and the reference source circuit, the rough reference voltage generation circuit, and the LDO, the switching controller can switch the electrical connection relationship between the reference source circuit, the rough reference voltage generation circuit, and the LDO, ensuring that the reference source circuit or the rough reference voltage generation circuit is electrically connected to the LDO during different stages of the power supply signal change, such that the LDO can follow the power supply signal's change, start up quickly, and operate stably, which may ensure flexibility for different application scenarios. More importantly, by arranging the rough reference voltage generation circuit, the rough reference voltage generation circuit can provide a reference voltage for subsequent circuits instead of the reference source circuit during rapid startup, thereby avoiding overshoot in the reference source circuit, ensuring stable operation, and ensuring flexibility in adapting to changes in the power supply signal.

The technical solution of the present disclosure sets up a connection relationship between the comparison circuit and the switching controller. Under the trigger of the comparison circuit, the switching controller is controlled to switch the connection relationship between the LDO and the rough reference voltage generation circuit and the reference source circuit, so as to ensure that under the power supply signal change at the voltage-dividing resistor terminal of the power supply, the electrical connection relationship between the LDO and the reference source circuit/rough reference voltage generation circuit can be quickly switched, thereby avoiding the influence of the power supply signal change on the LDO when the LDO is started up quickly.

The above is only some embodiments of the present disclosure, but the scope of the present disclosure is not limited thereto. Any changes or substitutions that may be easily conceived within the technical scope disclosed by the present disclosure by those skilled in the art shall be covered by the scope of the present disclosure.

What is claimed is:

1. An overshoot protection circuit, comprising: a low drop regulator (LDO), a reference source circuit, a switching controller, and a rough reference voltage generation circuit; wherein the switching controller is configured to control the LDO to be connected to the rough reference voltage generation circuit in a first stage of power supply signal change, and control the LDO to be connected to the reference source circuit in a second stage of power supply signal change;

wherein the overshoot protection circuit further comprises a comparison circuit, respectively electrically connected to the reference source circuit and the switching controller, and the switching controller is respectively electrically connected to the reference source circuit, the rough reference voltage generation circuit, and the LDO;

wherein the comparison circuit comprises a comparator and a delay circuit, the comparator being respectively electrically connected to the delay circuit and the reference source circuit, and the delay circuit being electrically connected to the switching controller;

wherein a positive input terminal of the comparator is electrically connected to a voltage-dividing resistor terminal of a power supply, a negative input terminal of the comparator is electrically connected to the reference source circuit, an output terminal of the comparator is electrically connected to an end of the delay circuit, and another end of the delay circuit is electrically connected to the switching controller to input a trigger signal to the switching controller;

wherein the rough reference voltage generation circuit is configured to generate a first preset reference voltage, and the reference source circuit is configured to generate a second preset reference voltage; in the first stage of power supply signal change, the switching controller is configured to electrically connect the LDO to the first preset reference voltage; in the second stage of power supply signal change, the switching controller is configured to electrically connect the LDO to the second preset reference voltage.

2. The overshoot protection circuit according to claim 1, wherein the switching controller comprises at least one switch; opening and closing of the at least one switch is controlled in response to a trigger signal of the comparison circuit, and the reference source circuit or the rough reference voltage generation circuit is caused to be electrically connected to the LDO via the at least one switch that is opened or closed.

3. The overshoot protection circuit according to claim 2, wherein the at least one switch comprises a first switch and a second switch, the first switch being electrically connected to the reference source circuit and the second switch being electrically connected to the rough reference voltage generation circuit.

4. The overshoot protection circuit according to claim 1, wherein the first stage is a preset rapid change stage of a power supply signal, and in response to a first trigger signal of the comparison circuit, the first preset reference voltage is taken as a reference source for the LDO via the switching controller; the second stage is a preset stable stage of the power supply signal, and in response to a second trigger signal of the comparison circuit, the second preset reference voltage is taken as the reference source for the LDO via the switching controller.

5. The overshoot protection circuit according to claim 1, wherein the reference source circuit comprises a bandgap voltage reference source and a buffer register, the bandgap voltage reference source being electrically connected to a voltage-dividing resistor terminal of a power supply and the comparison circuit, and the buffer register being electrically connected to the bandgap voltage reference source and the switching controller.

6. The overshoot protection circuit according to claim 1, wherein the second preset reference voltage is generated by resistive voltage division or a MOS tube or a constant current source in the rough reference voltage generation circuit.

7. An overshoot protection method, performed by the overshoot protection circuit according to claim 1 and comprising:
  performing a circuit powering-on;
  in a case where the comparison circuit outputs a first trigger signal, triggering the switching controller to control the LDO to be connected to the rough reference voltage generation circuit; wherein a first preset reference voltage generated by the rough reference voltage generation circuit is taken as a reference source for the LDO; the first trigger signal indicates that a change stage of a power supply signal is the first stage which is a rapid change stage; and
  in a case where the comparison circuit outputs a second trigger signal, triggering the switching controller to control the LDO to connect to the reference source circuit; wherein a second preset reference voltage generated by the reference source circuit is taken as the reference source for the LDO; the second trigger signal indicates that the change stage of the power supply signal is the second stage which is a stable change stage.

8. The overshoot protection method according to claim 7, wherein the switching controller comprises at least one switch; opening and closing of the at least one switch is controlled in response to a trigger signal of the comparison circuit, and the reference source circuit or the rough reference voltage generation circuit is caused to be electrically connected to the LDO via the at least one switch that is opened or closed.

9. The overshoot protection method according to claim 8, wherein the at least one switch comprises a first switch and a second switch, the first switch being electrically connected to the reference source circuit and the second switch being electrically connected to the rough reference voltage generation circuit.

10. The overshoot protection method according to claim 7, wherein the first stage is a preset rapid change stage of a power supply signal, and in response to a first trigger signal of the comparison circuit, the first preset reference voltage is taken as a reference source for the LDO via the switching controller; the second stage is a preset stable stage of the power supply signal, and in response to a second trigger signal of the comparison circuit, the second preset reference voltage is taken as the reference source for the LDO via the switching controller.

11. The overshoot protection method according to claim 7, where the reference source circuit comprises a bandgap voltage reference source and a buffer register, the bandgap voltage reference source being electrically connected to a voltage-dividing resistor terminal of a power supply and the comparison circuit, and the buffer register being electrically connected to the bandgap voltage reference source and the switching controller.

12. The overshoot protection method according to claim 7, wherein the second preset reference voltage is generated by resistive voltage division or a MOS tube or a constant current source in the rough reference voltage generation circuit.

13. A chip, comprising the overshoot protection circuit according to claim 1.

14. The chip according to claim 13, wherein the switching controller comprises at least one switch; opening and closing of the at least one switch is controlled in response to a trigger signal of the comparison circuit, and the reference source circuit or the rough reference voltage generation circuit is caused to be electrically connected to the LDO via the at least one switch that is opened or closed.

15. The chip according to claim 14, wherein the at least one switch comprises a first switch and a second switch, the first switch being electrically connected to the reference source circuit and the second switch being electrically connected to the rough reference voltage generation circuit.

16. The chip according to claim 13, wherein the first stage is a preset rapid change stage of a power supply signal, and in response to a first trigger signal of the comparison circuit, the first preset reference voltage is taken as a reference source for the LDO via the switching controller; the second stage is a preset stable stage of the power supply signal, and in response to a second trigger signal of the comparison circuit, the second preset reference voltage is taken as the reference source for the LDO via the switching controller.

17. The chip according to claim 13, where the reference source circuit comprises a bandgap voltage reference source and a buffer register, the bandgap voltage reference source being electrically connected to a voltage-dividing resistor terminal of a power supply and the comparison circuit, and the buffer register being electrically connected to the bandgap voltage reference source and the switching controller.

18. The chip according to claim 13, wherein the second preset reference voltage is generated by resistive voltage division or a MOS tube or a constant current source in the rough reference voltage generation circuit.

\* \* \* \* \*